United States Patent Office 3,470,972
Patented Oct. 7, 1969

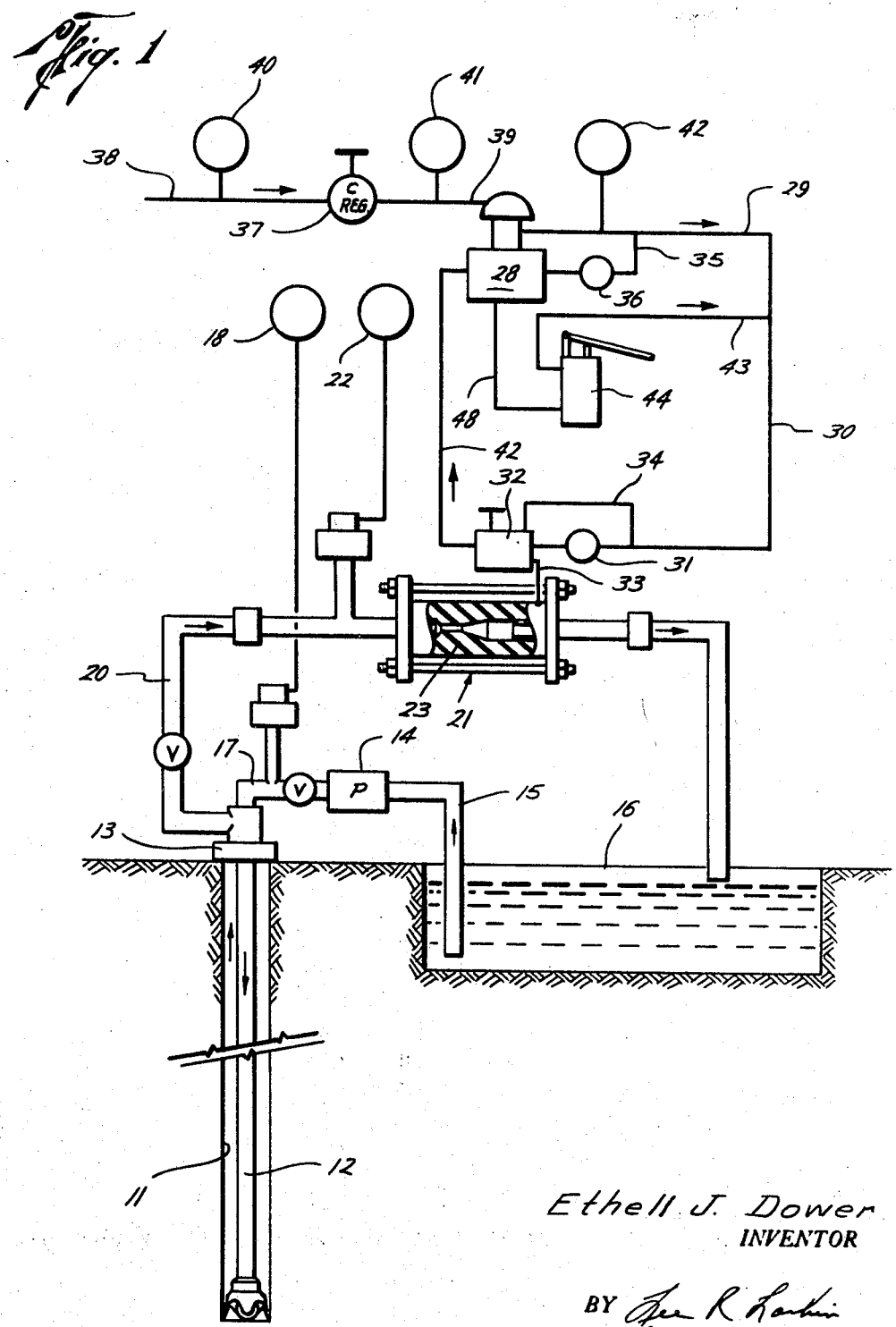

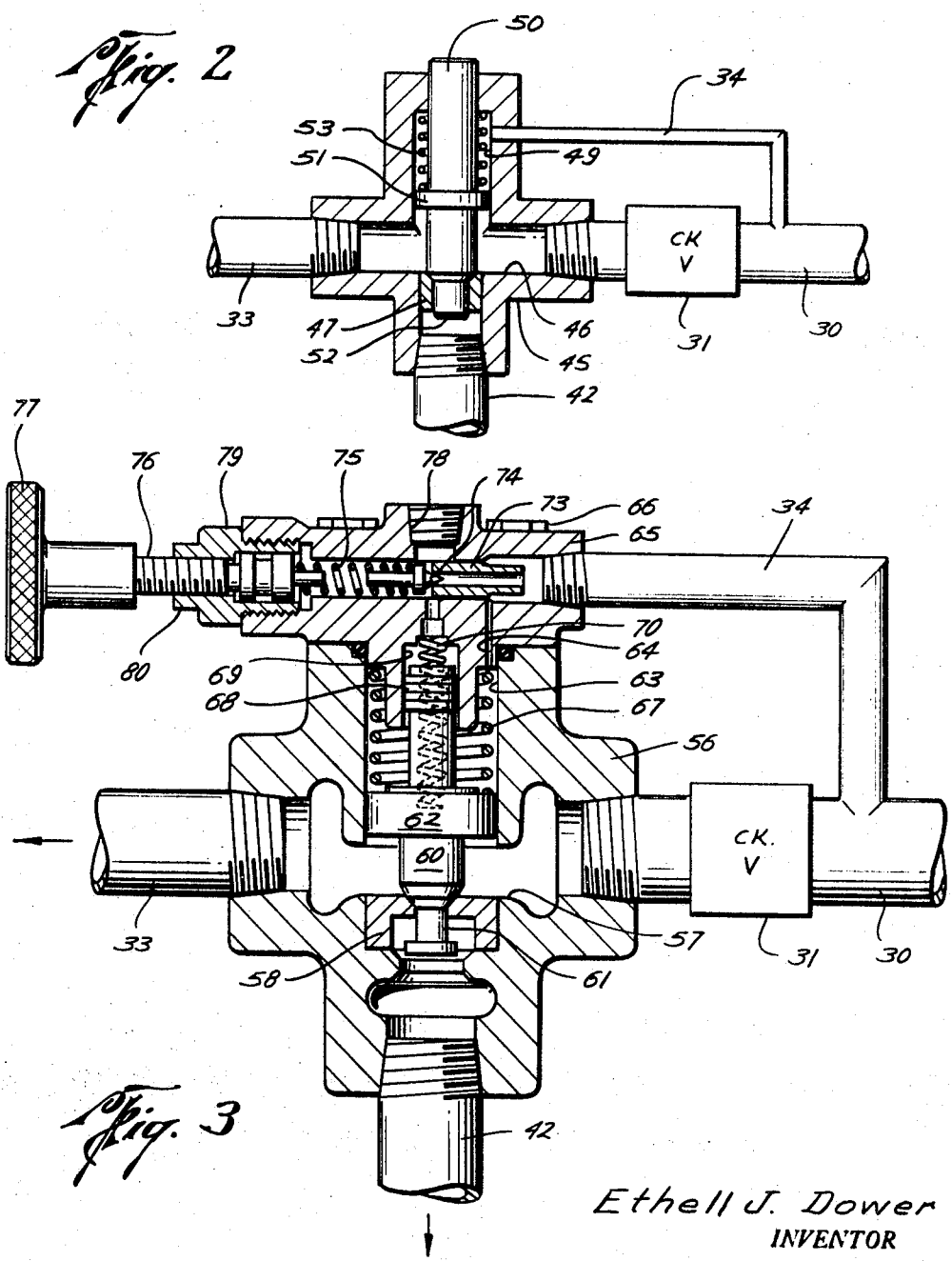

3,470,972
BOTTOM-HOLE PRESSURE REGULATION
APPARATUS
Ethell J. Dower, Houston, Tex., assignor to Warren Automatic Tool Company, Houston, Tex., a corporation of Texas
Filed June 8, 1967, Ser. No. 644,531
Int. Cl. A21b *3/00*
U.S. Cl. 175—25                            6 Claims

ABSTRACT OF THE DISCLOSURE

Apparatus for controlling bottom-hole pressure in a well being drilled by holding the drilling fluid returning from the the well bore at selected pressures. It includes means for enlarging and restricting an orifice through which the returning drilling fluid is passed and a means for adjusting the size of the orifice in response to changes in the flow characteristics (e.g. gas slugs and debris) of the fluid arriving at the orifice so that the device used to hold the correct pressure will properly compensate for changes in flow characteristics.

---

This invention relates to apparatus for controlling bottom-hole pressure in a well being drilled and having means for generating a selected back pressure on fluid returning from the well. More specifically it relates to such apparatus and includes means responsive to return fluid pressure in excess of the selected back pressure plus a constant, for adjusting the back pressure generating means to relieve the excess pressure before it produces a corresponding excess in the bottom-hole pressure.

During the drilling of oil wells wherein a circulating fluid is used, such as drilling mud, it is common practice to impose a back pressure on the drilling fluid in certain circumstances for controlling "kicks," i.e. incursion of salt water or formation gas into the drilling fluid, which might portend a blow-out condition. When such a condition becomes apparent, it is common practice to divert the returning drilling fluid through a valve or regulator device which will impose a back pressure, which back pressure plus hydrostatic head pressure of the mud will keep the well under control until heavier weight mud can be circulated into the drill pipe and bore hole. Various devices have been used for imposing this back pressure including mechanically operated valves as well as hydraulic or fluid pressure actuated valves.

Certain prior art devices utilize a fluid actuated regulator means for generating back pressure on the return fluid, and have a dump valve to relieve the actuating fluid pressure when the pressure generated by the return fluid exceeds a pre-set amount, without regard to the relationship between the actuating fluid pressure and the return fluid pressure. The result is that quite often the pressure on the return fluid is not relieved before excessive pressure is reflected back down the well.

This invention provides automatic compensation means in apparatus for controlling bottom-hole pressure in a well bore by imposing a back pressure on the return fluid.

Briefly stated, this invention contemplates back pressure regulator systems which are primarily controlled or set to hold selected back pressures, combined with a secondary control which will so adjust the regulator that it compensates for variations in the flow characteristics (e.g., gas slugs or debris) of the return fluid arriving at the regulator and thereby holds the selected back pressure at or substantially at the value set by the primary control.

Stated another way, one apparatus embodiment of this invention is for controlling pressure in a well having a drill string and drilling fluid therein, and a return line connected to the well, with the return line having fluid pressure actuated regulator means for controlling back pressure on the return fluid. It includes in combination therewith the improvement which comprises means operably connected to the return line for applying the pressure of the return fluid to relieve the pressure of actuating fluid applied to the regulator means when return fluid pressure increases relative to the actuating fluid pressure by more than a predetermined amount or constant.

Reference to the drawing which illustrates a preferred embodiment will further explain the invention.

In the drawings:

FIG. 1 is a schematic view, partially in side elevation, showing the invention as it is installed on a drilling rig drilling a well.

FIG. 2 is a schematic central sectional view of one embodiment of the pressure relief valve utilized in the invention.

FIG. 3 is an alternate embodiment of another type of pressure relief valve which may be utilized in the invention herein.

Referring to the drawings and FIG. 1 in particular, a well bore with casing in place is generally shown by the numeral 11 having a drill string 12 suspended therein which is adapted for rotation and for passage of drilling mud downwardly therethrough as shown by the arrows. Drill string 12 is supported and rotated by conventional rotary table having blow-out preventors mounted therebelow, with the rotary table and blow-out preventor both being generally designated by the numeral 13. Pressurized drilling fluid for passage down through drill spring 12 is supplied by rig mud pump 14 connected to suction line 15 for drawing from mud tank 16. The output of pump 14 is applied through mud line 17 to drill string 12. Mud line 17 has attached thereto a closed system diaphragm operated drill pipe pressure gauge 18 for showing the pressure of the drilling mud just prior to entry thereof into drill string 12 (drill pipe pressure).

There is included a fluid conduit or fluid return line connected to the well for receiving returning drilling fluid in the form of return line 20 connected to the casing for receiving the returning drilling fluid. Under normal circumstances return line 20 will deliver the returning drilling mud to the conventional mud handling system which might include shale shakers, degassers and the like, with no back pressure being exerted on the drilling fluid. However, upon indication of a possible blow-out condition, return line 20 is adapted to deliver the returning drilling fluid to a fluid pressure actuated regulator means in the form of casing pressure regulator 21 which is adapted for controlling the rate of drilling fluid flow therethrough to thereby impose the desired amount of back pressure on the drilling fluid, to thereby maintain the well under control. Return line 20 is also connected to a diaphragm operated closed circuit casing pressure gauge 22 which is adapted to provide a reading of the pressure of the returning drilling fluid (casing pressure). Since pressure gauge 22 is located upstream from casing pressure regulator 21, it is responsive to and measures the back pressure imposed by regulator 21.

Casing pressure regulator 21 can take many different forms, but it is important that it be of a type which is fluid pressure actuated and is responsive to the pressure of the drilling fluid which is being controlled thereby. Regulator 21, as shown, includes a tubular rubber sleeve 23 mounted in a generally tubular shaped housing 24 and is adapted for the application of actuating fluid pressure to the right end thereof, as viewed in FIG. 1. Upon axial compression by application of fluid pressure thereto, the size of the orifice therethrough is reduced, thereby imposing back pressure on the mud. Applicant is making no claim in this application to the specific pressure regulator, and other pressure regulators which are fluid operated to impose back pressure on the return drilling mud and which are responsive to the pressure of the returning drilling mud, may be used in certain embodiments of the invention. The automatic choke described in the magazine entitled The Oil and Gas Journal, Oct. 18, 1965, pp. 7, 52, and 53, and the regulator described in the magazine entitled The Oil and Gas Journal, Aug. 9, 1965, at pp. 8, 94, and 95, are examples of other types of pressure regulators which may be used in the combination.

It is to be understood that the fluid pressure actuated regulator means must be of the type which can impose the desired back pressure on the return drilling mud so that mud circulation through the drill pipe may be continued such that a heavier weight mud may be circulated into the well to thereby control the "kick" until hydrostatic pressure alone can control the well. At this point the casing pressure regulator can thereafter be taken out of operation until another potential blow-out condition arises. Since the amount of fluid pressure required to actuate the casing pressure regulator 21 to the closed position is also a function of the pressure of the returned drilling fluid, the fluid pressure applied to the pressure regulator 21 must be carefully controlled and coordinated with the pressure on the returning drilling fluid. If not, then a back pressure of too great a level may be imposed on the formation, thereby causing possible loss of circulation to the formation.

Referring now to FIG. 1, the drilling fluid is returned to mud tank 16 through discharge line 24 after passage through pressure regulator 21.

The actuating fluid pressure applied to pressure regulator 21 is supplied by a pneumatically controlled hydraulic pump 28, such as the air driven pilot operated hydraulic pump sold by Haskel Engineering and Supply Company of Burbank, Calif., as its Model No. 16821-AO-60, which is a standard air operated hydraulic pressure intensifier. Pump 28 is adapted to pump a hydraulic fluid, such as oil, at a predetermined pressure level to casing pressure regulator 21 through conduit means including line 29 which is connected to input line 30, through one-way check valve 31, through an automatic back pressure relief valve in the form of dump valve 32, to line 33. For purposes of convenience, line 33 may sometimes be referred to as an output line, but it should be understood that it is also the input and output line with respect to fluid flow between regulator 21 and dump valve 32. Dump valve 32 is also connected with bypass line 34 which is connected to input line 30 at a point upstream from check valve 31, the purpose of which will be explained hereinafter.

Pump 28 also has connected thereto a bypass line 35 which connects to line 29 and has mounted therein a constant bleed valve 36 for diverting a portion of the fluid from line 29, which provides a means for releasing the pressure level of the fluid in the conduit means leading to regulator 21, as for example, during the phase of the operation wherein fluid pressure on regulator 21 is being reduced. It also permits continuous cycling of pump 28 such that the fluid pressure applied to regulator 21 can be controlled by one valve which controls the output of pump 28, which valve is in the form of manual control regulator valve 37 supplied with air pressure from any convenient source through air line 38, with the output thereof being applied to air line 39 leading to pump 28 and controlling the output thereof. For control purposes, air line 38 has pressure gauge 40 connected thereto and line 39 has air gauge 41 connected thereto. Further, oil pressure gauge 42 is connected to line 29 for visually observing the pressure of the hydraulic fluid being delivered to pressure regulator 21 through the conduit means described above.

In case of failure of pump 28 for any reason, fluid pressure can be supplied to line 30 by means of hand pump 44 through line 43 with pump 44 being connected to the oil reservoir of pump 28 by line 48. Dump valve 32 is connected to line 42 for delivering the fluid to pump 28 during a dumping phase of operation of dump valve 32.

One form of dump valve 32 is shown in FIG. 2, and includes a body member 45 having a generally elongated valve chamber 46 having inlet and outlet means in the form of openings, one of which communicates at one end with input line 30 and at the other of which communicates with output line 33 at the other end. Body member 45 also has a relief port formed by valve seat 47 with the port thereof communicating with dump return line 42. For purposes of convenience, that end of chamber 26 communicating with line 33 may sometimes be referred to as the outlet means. However, it should be understood that this particular opening may also serve as inlet means to chamber 26 under certain circumstances.

Referring still to FIG. 2, line 30 has one-way check valve 31 interposed therein at a position adjacent to and leading to the input side of body member 45. In addition, bypass line 34 is connected to input line 30 at a point ahead of, or upstream from, check valve 31, and to piston cylinder 49 in the upper portion of body member 45, as shown in FIG. 2.

Body member 45, and hence piston cylinder 49 and chamber 46 have mounted therein a valve closure means for normally closing the relief port defined by valve seat 47, with the valve closure means being adapted to open the relief port when pressure applied through the outlet means of chamber 46, i.e. the pressure in line 33, exceeds the pressure applied to chamber 46, through its inlet means, i.e. the actuating fluid pressure applied through line 30. The valve means conveniently takes the form of a generally cylindrical closure member 50 adapted for vertical up and down movement in piston cylinder 49 of body member 45, as shown in FIG. 2. Closure member 50 has an externally enlarged portion 51 and lower reduced portion 52, with lower reduced portion 52 forming a shoulder which seats with valve seat 47 to close off the relief port defined by valve seat 47. Closure member 50 is adapted to normally be biased to the closed position as shown in FIG. 2, which biasing means is conveniently in the form of coil spring 53 surrounding closure member 50 and abutting against the upper shoulder of portion 51 and exerting a downward force thereon equal to the force of spring 53. Bypass line 34 applies fluid pressure to the upper shoulder of portion 51, and the fluid pressure in chamber 46 is applied to the lower shoulder of portion 51. It is to be understood that different biasing means can be used for urging closure member 50 to the closed position and could take the form of providing portion 51 with a larger upper surface area to be acted upon by the fluid pressure delivered by bypass line 34. In any event, the biasing force required to maintain closure member 50 in the closed position should be a minimum force so that closure member 50 is responsive to open the relief port at appropriate times as will be described hereinafter. This biasing force may sometimes be referred to as a "constant" or a "predetermined amount of force." The amount of this force may be varied by replacing spring 53 with a stronger or weaker spring, as desired.

In operation, the rig valves upstream of casing pressure regulator 21 will normally be closed until a potential blow-out condition arises, at which time the blowout preventors indicated by the numeral 13 are closed. At this point, the shut-in casing pressure is taken in conventional manner while the well is thus shut in. Then by operation of regualtor valve 37, pump 28 is caused to produce an actuating fluid pressure in the form of oil pressure output through lines 29, 30, check valve 31, dump valve 32, and output line 33. The oil pressure thus applied to regulator 21 is sufficiently greater than the casing pressure previously taken to close off drilling mud flow through pressure regulator 21. The amount of pressure will vary with various pressure regulators depending upon their efficiency and responsiveness. In the embodiment shown, the pressure of the oil supplied thereto may be on the order of 800 p.s.i. more than the casing pressure.

At this point, the valves upstream from pressure regulator 21 are then opened allowing the returning drilling fluid to be applied to pressure regulator 21, which would then be in the closed position. The pressure of the drilling mud on sleeve 23 generates a pressure which is applied to line 33, since sleeve 23 acts as a diaphragm between the actuating fluid in line 33 and the drilling fluid in line 20.

When the well is ready to be circulated through pressure regulator 21, for the purpose of circulating heavier weight mud for example, the oil pressure applied by pump 28 to regulator 21 is reduced by operation of regulator valve 37, until pressure regulator 21 starts to open and to have drilling mud flow therethrough. In the embodiment shown, mud flow through regulator 21 might start when oil pressure is about 500 p.s.i. above drilling mud pressure or casing pressure, and the well is ready to circulate.

The oil pressure applied to pressure regulator 21 may be lowered to approximately 350 p.s.i. above casing pressure during the actual circulating operation. The actual pressure of the oil will depend somewhat upon the circulating rate and the operating efficiency of the closure means of casing pressure regulator 21. In any event, the operation of the casing pressure regulator 21 is such that an increase or decrease in actuating fluid pressure applied thereto will result in the casing pressure, as shown by casing pressure gauge 22, having a pressure change of the same general magnitude.

Bleed valve 36 will normally be set so that pump 28 will cycle about 5 strokes per minute. By allowing this slight hydraulic bleed, the casing pressure can be increased or decreased by using only the pump supply regulator valve 37, which resutls in a one valve control of regulator 21. The desired casing pressure can then be obtained and maintained by the operation of regulator valve 37.

If it is necessary to shut the well in at any time, this can be done by stopping rig pump 14 and increasing the oil pressure applied to casing pressure regulator 21, as for example, to about 800 p.s.i. over casing pressure, or the pressure differential required to close pressure regulator 21, whatever it may be.

The orifice size through regulator 21 is controlled by both the oil pressure from pump 28 and the casing pressure. As the oil pressure applied to regulator 21 increases, the orifice size through sleeve 23 will decrease and casing pressure will increase, other things being equal. Conversely, a decrease in oil pressure will increase the orifice size and the casing pressure will decrease.

It is during the foregoing operation that the pressure relief valve shown in FIG. 2 comes into operation. If at any time the output pressure from chamber 46, i.e. the pressure applied through line 33, exceeds the actuating pressure, i.e. the pressure applied through input line 30, by the amount of biasing force (constant or predetermined amount) exerted by coil spring 53, then closure member 50 will be moved to the open position with respect to valve seat 67 and oil pressure will be relieved through dump return line 42.

Such a condition might occur, for example, if the orifice through sleeve 23 of regulator 21 should become plugged by a solid object, such as piece of drill pipe centralizer, or the like. When this occurs, flow of drilling mud through sleeve 23 is normally stopped or greatly reduced, with the result that there is a rapid and considerable increase in the pressure on oil in line 33 and on the return fluid. However, with applicant's invention, these increased or excess pressures are automatically and quickly relieved so that the solid object can pass through sleeve 23, thereby preventing rupturing of the lines making up the system, and preventing any excess pressure on the return fluid from being reflected back down the well. This dumping occurs when the oil pressure in line 33 thus generated by the drilling mud exceeds the actuating pressure of oil applied by input line 30 from pump 28 by more than the constant or predetermined amount (i.e. the biasing force of spring 53). At this point valve closure member 50 moves to the open position, thereby relieving pressure through dump return line 42.

Hence, automatic dump valve 32 is adapted to automatically control the presence differential between the actuating pressure applied through input line 30 and the oil pressure generated on line 33, since the pressure in line 30 is applied through bypass line 34 to the upper surface of portion 51. Also, when the pressure generated in line 33 by the drilling fluid exceeds the pressure in line 30, check valve 31 prevents reverse flow of fluid through line 30.

Another example where this invention might come into operation is when regulator sleeve 23 is contracted to a very small orifice size during circulation out of the gas causing the kick, for example. When the gas is circulated out, there immediately follows a slug of mud. The mud requires a larger size orifice through sleeve 23 to maintain the same back pressure. Hence the oil pressure generated on line 33 and pressure on the return fluid increase very quickly, but are immediately relieved by operation of this invention in the same manner as explained in the example above.

Referring now to FIG. 3, another embodiment is shown which includes means for moving the closure member to the open position when the pressure level in the chamber inside of the relief valve exceeds a predetermined level, such that another safety factor is provided in the event the pressure level should exceed the predetermined level for any reason. In addition, the embodiment shown in FIG. 3 also has means for adjusting or changing the predetermined level at which the closure member moves to the open position to provide for a variable safety factor, depending upon the circumstances and the apparatus being used. In this instance, the hydraulic back pressure relief valve includes a body member 56 which has a chamber 57 therein which communicates with input line 30 at one side and line 33 at the other side, which lines correspond with lines 30 and 33 shown in FIG. 2. Body member 56 also has an output port defined by valve seat 58 which port connects to dump return valve 42, the same as in the embodiment shown in FIG. 2. Similarly check valve 31 is connected in line 30 and bypass line 34 connects with body member 56 and input line 30, as shown, and as similarly shown in FIG. 2.

In this embodiment, the valve closure member is in the form of spool shaped closure member 60 having reduced lower end portion 61 forming a shoulder which seats with valve seat 58. Closure member 60 has an externally enlarged portion forming main piston 62 which is mounted for axial movement in cylindrical chamber 63, which communicates with chamber 57 as shown. Fluid pressure in chamber 57 is adapted to move piston 62 upward and fluid pressure in chamber 63 in adapted to move piston 62 downward. Chamber 63 communicates with bypass line 34 through conduit 64 provided in control cap 65, which is held in sealed relationship with body member 56 by screws 66.

Piston 62 is biased to the closed position by means of coil spring 67 mounted in chamber 63. Closure member 60 is also provided with a reduced piston 68 having an axial recess therein. Piston 68 is adapted for movement up and down in cylinder 69 provided in the lower end of control cap 65. Closure member 60 is additionally biased downward by inside coil spring 70 mounted there inside and against the base of cylinder 69 of cap 65. The amount of biasing force exerted on closure member 60 can be varied by removal of one of the springs 67 or 70, or by replacement with springs exerting different forces.

When fluid pressure in chamber 57 exceeds the fluid pressure in 63 plus the biasing force of springs 67 and 70, then closure member 60 will move to the open position thereby dumping fluid out return line 42. Again, the biasing force exerted by springs 67 and 70 may sometimes be referred to as a "constant" or "a predetermined amount of force." The dumping operation not only relieves the excess pressure generated in the oil in line 33, but thereby also relieves the excess pressure on the return fluid to prevent excess pressure from being reflected back down the well to the bottom of the hole.

The embodiment shown in FIG. 3 also includes means for moving closure member 60 to the open position when the pressure level in chamber 57 exceeds a safe level, and these means are adjustable for varying this level. These means include valve seat 73 mounted in control cap 65 in the orifice leading to bypass line 34 and having a cone 74 mounted for seating engagement therewith and blocking off fluid flow through valve seat 73. Cone 74 is biased to the closed position by coil spring 75, the left end of which, as viewed in FIG. 3, is contacted by threaded plunger 76, which is operated by handle knob 77. By turning on knob 77 the amount of pressure on spring 75 can be controlled to thereby set the point at which cone 74 opens, in response to fluid pressure applied either through bypass line 34 or through conduit 64. When cone 74 opens, then fluid is permitted to flow out of auxiliary dump port 78 in the top of cap 65. Plunger 76 is held in place by bonnet 79 and nut 80.

The foregoing arrangement of the relief valve provides a safety factor whereby pressure will be relieved from chamber 57 at an adjustable level to insure that no damage is done to the equipment which is operated with the relief valve. Other prior art systems have included dump valves for safety purposes, but not in combination with the other features described above, including check valve 31 and line 34, for example.

Further modifications may be made in the invention as particularly described without departing from the scope thereof. Accordingly, the foregoing description is to be construed as illustratively only and is not to be construed as a limitation upon the invention as defined in the following claims.

What is claimed is:
1. In a system for controlling pressure in a well bore having a drill string and drilling fluid therein, the combination comprising:
   means for circulating drilling fluid through said drill string;
   a fluid return line connected to said well for receiving therethrough return drilling fluid from said well;
   a fluid pressure actuated regulator connected in said return line for applying back pressure on said return fluid;
   means for supplying a pressurized actuating fluid to said regulator;
   and a valve connected to said means for supplying a pressurized actuating fluid to said regulator, said valve being simultaneously actuatable by both said actuating fluid pressure and said return drilling fluid pressure and arranged to automatically relieve said actuating fluid pressure when said return fluid pressure exceeds said actuating fluid pressure by more than a predetermined amount.

2. The invention as claimed in claim 1 wherein:
   said valve includes a valve closure member arranged for relieving actuating fluid pressure applied to said regulator;
   and means operably connected to said closure member for automatically moving said valve member to the pressure relieving position when pressure downstream of said valve member exceeds applied actuating fluid pressure by more than a predetermined amount.

3. The invention as claimed in claim 1 wherein:
   said valve includes a valve closure member arranged for relieving actuating fluid pressure applied to said regulator;
   and biasing means for normally biasing said closure member to the closed position.

4. The invention as claimed in claim 1 wherein:
   said valve includes a valve closure member arranged for relieving actuating fluid pressure applied to said regulator;
   and by-pass means for applying actuating fluid pressure to urge said closure member toward the closed position.

5. The invention as claimed in claim 1 wherein:
   said valve includes a valve closure member arranged for relieving actuating fluid pressure applied to said regulator;
   biasing means for normally biasing said closure member toward the closed position;
   and by-pass means for applying actuating fluid pressure to urge said closure member toward the closed position.

6. The invention as claimed in claim 4 wherein:
   said means for supplying a pressurized actuating fluid to said regulator includes a first fluid conduit connected to said valve, said first conduit having a one-way check valve therein;
   and said by-pass means includes a second conduit connected to said valve at one end, with the other end thereof connected to said first conduit upstream of said check valve.

References Cited
UNITED STATES PATENTS

| 1,846,483 | 2/1932 | Gilbert | 138—46 X |
| 2,122,080 | 6/1938 | Wisdom | 138—46 |
| 2,444,101 | 6/1948 | Johnson | 138—46 |
| 2,802,486 | 8/1957 | Frey | 138—46 |
| 2,925,243 | 2/1960 | Griswold | 138—46 X |
| 3,073,350 | 1/1963 | Dillman | 138—46 |
| 3,362,487 | 1/1968 | Lindsey | 166—53 X |
| 2,100,997 | 11/1937 | Russel | 103—42 X |
| 2,102,865 | 12/1937 | Vickers | 103—42 X |
| 3,338,319 | 8/1967 | Griffin | 175—25 |
| 3,396,793 | 8/1968 | Piper | 166—53 |

NILE C. BYERS, Jr., Primary Examiner